United States Patent
Lynes

(10) Patent No.: US 7,536,847 B2
(45) Date of Patent: May 26, 2009

(54) CROP PICK-UP HEAD FOR HARVESTING CROPS DISPOSED ON CONTINUOUS TRAYS

(76) Inventor: Dewain B. Lynes, 19894 Avenue 16-1/2, Madera, CA (US) 93637

( * ) Notice: Subject to any disclaimer, the term of this patent is extended or adjusted under 35 U.S.C. 154(b) by 238 days.

(21) Appl. No.: 11/726,900

(22) Filed: Mar. 23, 2007

(65) Prior Publication Data
US 2008/0229724 A1 Sep. 25, 2008

(51) Int. Cl.
- A01D 46/00 (2006.01)
- A01D 87/00 (2006.01)
- B65G 57/22 (2006.01)

(52) U.S. Cl. ............ 56/327.1; 56/327.2; 414/789.7; 414/418; 198/514

(58) Field of Classification Search ............ 56/16.6, 56/16.4 A–16.4 C, 327.1, 328.1, 328.2, 329, 56/344; 198/314, 512, 514, 518, 586; 209/247, 209/421; 414/789.7, 792, 902, 927, 502, 414/418, 406, 411
See application file for complete search history.

(56) References Cited

U.S. PATENT DOCUMENTS

| | | | |
|---|---|---|---|
| 1,781,857 A | 11/1930 | Pape | |
| 2,869,284 A | 1/1959 | Abernathy et al. | |
| 3,412,840 A | 11/1968 | Laikam | |
| 3,587,814 A | 6/1971 | Garabedian | |
| 3,587,931 A | 6/1971 | Studer et al. | |
| 3,762,577 A | 10/1973 | Olmo et al. | |
| 3,955,343 A | 5/1976 | Tico | |
| 4,221,665 A | 9/1980 | Decker | |
| 4,355,713 A * | 10/1982 | Adam | 198/514 |
| 4,759,680 A | 7/1988 | Simpson, III | |
| 4,830,831 A | 5/1989 | Simpson, III | |
| 4,832,553 A * | 5/1989 | Grey et al. | 414/789.7 |
| 5,042,240 A | 8/1991 | Rocca et al. | |
| 6,557,335 B2 * | 5/2003 | Amaro et al. | 56/328.1 |
| 7,086,216 B2 * | 8/2006 | Geraghty | 56/344 |

* cited by examiner

Primary Examiner—Robert E Pezzuto
(74) Attorney, Agent, or Firm—Richard A. Ryan

(57) ABSTRACT

A crop pick-up head for use with a harvesting machine to collect and separate a crop from a continuous paper tray on which the crop has been placed. The pick-up head has a support frame attached to the front of the harvesting machine, a fork to lift the paper tray, a guide plate positioned above the fork for the paper tray to slide between, a forward brush that pushes the crop off of the paper tray and onto the guide plate, a pulling mechanism to pull the paper tray and a conveying mechanism that receives the crop and conveys it to a bin. The pulling mechanism can comprise a roller, brush and mechanism to direct the paper tray between the roller and brush. The conveying mechanism can comprise a tube configured to receive the crop and a source of pressurized air to convey the crop to the bin.

20 Claims, 6 Drawing Sheets

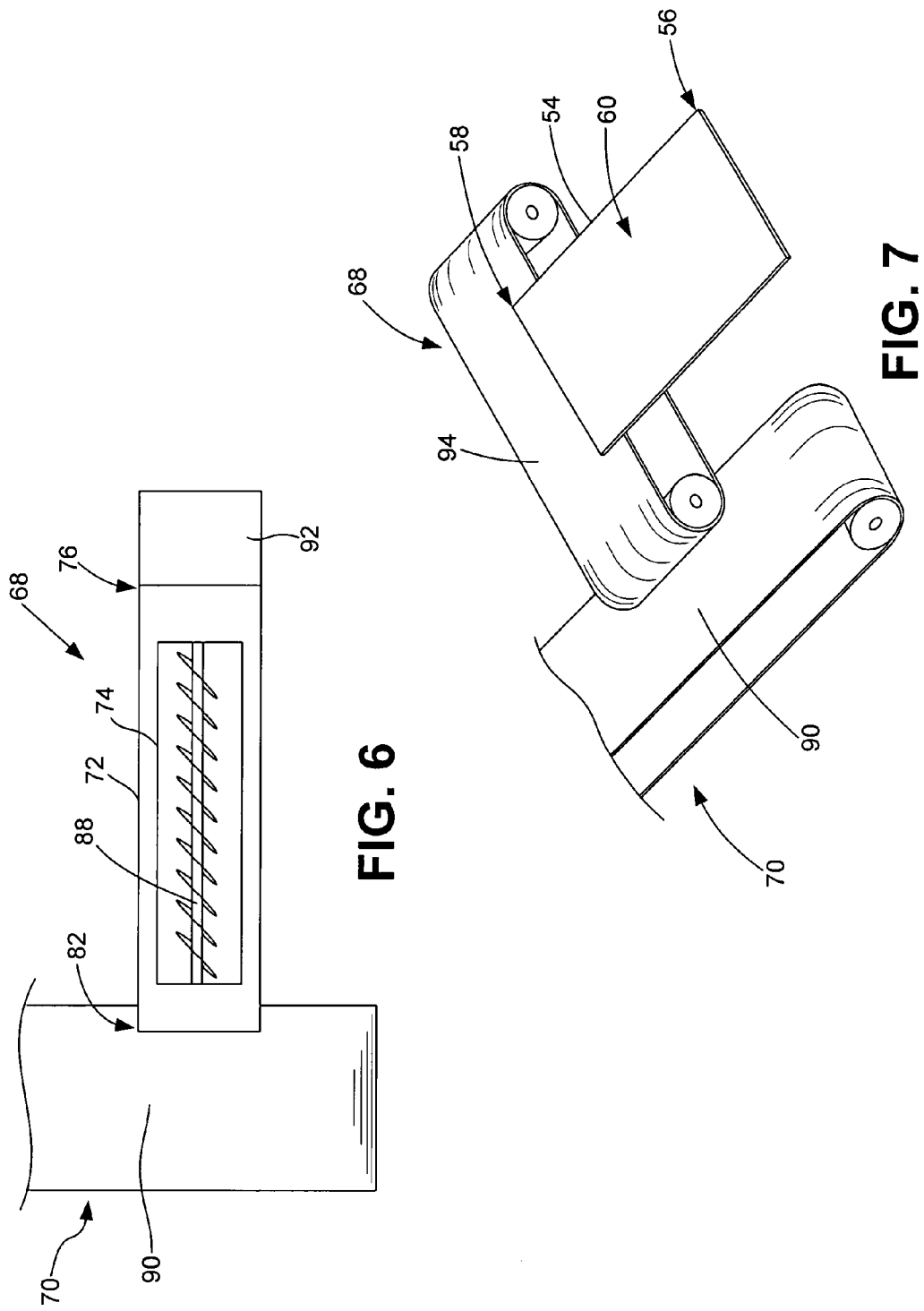

CROP PICK-UP HEAD FOR HARVESTING CROPS DISPOSED ON CONTINUOUS TRAYS

CROSS-REFERENCE TO RELATED APPLICATIONS

None.

BACKGROUND OF THE INVENTION

A. Field of the Invention

The field of the present invention relates generally to apparatuses for harvesting grapes, raisins and other crops. More particularly, the present invention relates to such apparatuses that are configured for collecting crops from the field that are disposed on continuous trays, such as those made out of paper and the like. Even more particularly, the present invention relates to such apparatuses that reduce labor by separating the crop from the continuous trays and depositing the crop in a bin or like receptacle.

B. Background

As is generally well known, the conventional methods of harvesting grapes, raisins and other vine crops is typically a very labor intensive process requiring a significant number of laborers to separate the crop from the vines and then harvest the crop from the field. Such methods generally require labor crews to walk through the vineyard and individually cut clusters of the fruit from the vine. As such, the economics of producing vine crops is subject to and substantially driven by such factors as labor availability, ever increasing labor and material costs, and, with regard to dried fruit, unpredictable weather. The conventional method of growing raisins is to grow grape vines in separate, generally parallel rows utilizing a trellis system that runs along the row, producing rows of vines that stand approximately four to six feet high. The predominate method of harvesting raisins in use today utilizes manual labor to cut the grapes from the vines, remove the grapes from the stems and then place the bunches of grapes on individual paper sheets, typically two feet by two feet in size and commonly referred to as trays, to dry in the sun. Periodically, the laborers turn the grapes on the trays to obtain more thorough drying. Once dried, the paper trays are folded and rolled, with the raisins disposed inside, and collected from the field. Once collected, the raisins are then separated from the trays, placed in raisin bins and delivered to packing houses for final processing before being sold.

While the above method has been successfully utilized for many years, the use of individual paper trays had a number of limitations with regard to the efficient harvesting of raisins. For instance, the laying out and later collecting of the individual paper trays is quite labor intensive. The removal of the grapes from the vines and their placement on the individual paper trays also requires a significant amount of labor. With increasing labor costs, this type of raisin production has become relatively very expensive and, therefore, less attractive to many raisin growers than more modern raisin production methods. The general unavailability of labor to perform the necessary operations to harvest the raisins in this manner, has only compound the problems facing the grower who is utilizing the conventional method of harvesting raisins.

As a result of increased labor costs and labor unavailability, many growers have opted to utilize one of the newer mechanized methods of raisin production. Two of the most common methods of raisin harvesting which take advantage of the benefits of increased mechanization are the continuous paper tray method of harvesting, to which the present invention pertains, and the dried-on-the-vine or DOV method of harvesting. Although the DOV method of harvesting raisins has certain advantages with regard to the process of drying grapes into raisins and mechanization of the harvesting of the dried raisins, it has certain disadvantages that has prevented many growers from being able to switch to DOV harvesting. Chief among the disadvantages is that most of the DOV methods of harvesting raisins require the vines to be grown in a specialized manner which facilitates later cutting a portion of the vine to cause the grapes to dry into raisins while still attached to the vine. The cost of installing a trellis system that advantageously supports the vines for the chosen DOV method and the cost of the equipment to efficiently and effectively harvest the DOV raisins hanging on the vines creates substantial barriers for many growers to the utilization of one the various DOV methods.

The continuous paper tray method of harvesting raising utilizes a paper tray which is laid out from a roll of paper instead of the individual two foot by two foot trays. The continuous paper tray typically extends the entire length of the area between two adjacent rows of vines. As with the individual paper trays, the continuous paper tray is typically laid out shortly before it is time to cut the grapes from the vines and place them on the continuous paper tray for drying in the sun. Once the raisins are sufficiently dry, the continuous paper tray and raisins are picked up from the field and taken to a packing facility for cleaning and/or other processing. Although the laying out of the continuous paper tray, removal of the grapes from the vines and placement of the grapes on the continuous paper tray, and the subsequent collecting of the raisins and paper tray can be done by utilizing hand labor, this would eliminate many of the benefits of this method of growing raisins. As a result, various procedures and mechanisms have been developed to improve the efficiency of raisin production and to reduce the costs associated with harvesting raisins by the continuous paper tray method. One mechanical method of harvesting/drying raisins with a continuous paper tray requires special soil preparation, namely that the row must be free of weeds and terraced smooth. The canes are hand cut about ten days prior to harvest so that the grape can be removed from the cluster with the stem attached. The grapes are then removed from the vines with a mechanical vibration system and simultaneously placed on a continuous tray. This procedure requires a four man crew. After the raisins are dried, they are mechanically removed from the tray and deposited into a bin trailer in the adjacent row using a mechanical conveyor system. This process requires two machines and two operators.

Some of the mechanisms for harvesting with continuous paper trays are addressed to machines capable of removing the green grapes from the vines and then placing them on the paper trays for drying. For instance, U.S. Pat. No. 2,869,284 to Abernathy, et al. describes an apparatus configured to unroll a strip of paper between adjacent rows of vines and cut the paper at the end of the row while it simultaneously deposits fruit on the paper. It is believed that this is one of the earliest patents to describe the placement of grapes on paper for the continuous paper tray method of harvesting raisins. U.S. Pat. No. 3,587,931 to Studer, et al. also describes a machine for depositing a continuous strip of paper tray on the ground and grapes on top of the paper tray. While both of these patents describe apparatuses for laying the continuous paper tray between the rows of vines and depositing grapes thereon for drying, neither patent addresses the need to later collect the raisins from the field.

As stated above, once the continuous paper tray is laid out on the ground and the grapes are placed on top thereof, there exists a need to collect the raisins from the field and separate them from the continuous paper tray. U.S. Pat. No. 3,762,577 to Olmo, et al. describes a raisin pick-up machine having a carriage that advances along the strip of paper in a manner that applies tension to the paper as the carriage advances. From the tensioned strip, the raisins are brushed into a receiver for conveyance to a bin carried by the machine. An elevating conveyor and presser wheel at the front of the machine start the paper into the tensioner. U.S. Pat. No. 3,955,343 to Tico describes a fruit harvesting machine for picking up, rolling up and storing a continuous paper strip having fruit placed thereon and a mechanism for transferring the fruit to a container for later transportation. As with the Olmo patent, this device comprises a device for guiding, supporting and moving the paper strip towards the rear of the machine. U.S. Pat. No. 4,221,665 to Decker describes a raisin harvesting apparatus that is configured for picking up raisin paper trays and depositing the raisins into bins. This apparatus has a rearward disposed fork mechanism which slides under the paper trays, a draper web situated above the fork for engaging the trays and sliding them along the fork to a conveyor mechanism that transfers the raisins to a receptacle. Workers standing on the running boards of the apparatus remove the raisins from the paper trays, which are impaled upon spikes for later disposal. U.S. Pat. No. 4,759,680 to Simpson, III describes an apparatus for separating a crop from a continuous paper tray that comprises a first conveyor that engages and transports the paper tray, having the crop thereon, to a second conveyor. The second conveyor engages and inverts the paper tray to dislodge the crop onto a third conveyor, which is placed in receiving relation to the second conveyor to receive the crop and then transport it to a collection point. U.S. Pat. No. 5,042,240 to Rocca, et al. describes a crop recovery apparatus comprising a first conveyor configured to receive and convey the continuous paper tray, a second conveyor moving with the first conveyor and configured to overlay the paper tray and crop on the first conveyor, finger members which maintain the space between the two conveyors, a vacuum system for removing debris and a folding mechanism that folds the first conveyor downward so the crop thereon will fall onto a third conveyor for conveyance to a receptacle.

Although the prior art does describe several harvesting apparatuses for picking-up continuous paper trays having crop thereon and separating the crop from the paper tray for transport to a raisin bin or other receptacle, each of the foregoing has limitations which have prevented their full acceptance for use with the continuous paper tray method of harvesting crops. What is needed, therefore, is an improved apparatus for picking up and separating raisins or other crops from a continuous paper tray. The preferred harvesting apparatus will be configured to move over the ground between two adjacent rows of plants, collect a continuous paper tray placed on the ground with crop placed on the paper tray, separate the crop from the paper tray and then convey the crop to a bin or other receptacle. Preferably, the harvesting apparatus will accomplish the above tasks with minimal input from laborers other than the operator of the apparatus. The preferred harvesting apparatus will be configured so as to be economical to manufacture and operate.

SUMMARY OF THE INVENTION

The crop pick-up head and harvesting apparatus of the present invention solves the problems and provides the benefits identified above. That is to say, the present invention discloses a new and improved crop pick-up head that can be attached to a variety of different harvesting apparatuses to collect a continuous paper tray laid out between rows of adjacent vines or other plants with crop placed thereon, separate the crop from the paper tray and convey the crop to a bin or other receptacle. The crop pick-up head of the present invention is configured to cooperate with a variety of crop conveying mechanisms to slide under a continuous paper tray so as to convey the paper tray to the rear of the crop conveying mechanism while separating the crop from the paper tray and convey the crop to a bin or the like. In one embodiment, the crop pick-up head of the present invention is attached to the front of an existing harvesting machine to effectively convert the machine to a harvesting apparatus for harvesting crop placed on top of a continuous paper tray. In an alternative embodiment, the crop pick-up head is incorporated into a harvesting apparatus that is useful for harvesting crops produced utilizing the continuous paper tray method. In either configuration, the crop pick-up head of the present invention harvests the crop with minimal need for additional laborers and is economical to manufacture and operate.

In one general aspect of the present invention, the crop pick-up head and harvesting machine for harvesting crops disposed on continuous trays comprises a support frame at the front end of the harvesting machine, a lifting mechanism for lifting the continuous tray, a forward brush that brushes the crop off of the continuous tray, a guide plate that receives the crop from the continuous tray, a conveying mechanism that receives the crop from the guide plate to convey it to a bin or other receptacle and a pulling mechanism for pulling the continuous tray through the crop pick-up head. In a preferred embodiment, the lifting mechanism is a fork having a plurality of spaced apart tines that project generally forward of the harvesting machine to lift the leading edge of the continuous tray and guide the continuous tray toward the harvesting machine. Other types of lifting mechanisms, such as compressed air, can also be utilized. The guide plate has a first or forward end that is placed substantially adjacent but in spaced apart relation to the lifting mechanism so that the continuous tray can pass in the small gap between the guide plate and the lifting mechanism. The forward brush brushes the crop off of the continuous tray onto the guide plate and pushes the crop towards the second end thereof, where the crop is received by the conveying mechanism. In a preferred embodiment, the conveying mechanism comprises a conveying tube having an intake opening that receives the crop into the conveying tube and a source of pressurized air that is pneumatically attached to the first end of the conveying tube to convey the crop to the second end of thereof, which is connected to a conveyor pipe or other mechanism for transferring the crop to the receptacle. In an alternative embodiment, an auger device is disposed in the conveyor tube to convey the crop to the mechanism for transferring the crop, which can be a rearward conveyor that conveys the crop to the receptacle. In another embodiment, the conveying mechanism is a lateral conveyor that receives the crop from the second end of the guide plate and conveys it to the rearward conveyor or other mechanism for transferring the crop to the receptacle. In the preferred embodiment, the pick-up head also comprises one or more positioning mechanisms for raising and lowering the lifting mechanism to move the harvesting machine or engage the continuous tray and for moving the lifting mechanism left or right so as to align it with the continuous tray. In use, the lifting mechanism lifts the continuous tray, the forward brush brushes the crop off of the continuous tray onto and across the guide plate to the conveying mechanism so that the crop is conveyed to the receptacle and the continuous tray is pulled between the guide plate and lifting mechanism by the pulling mechanism, which directs the continuous tray down and behind the crop pick-up head.

Accordingly, the primary objective of the present invention is to provide a crop pick-up head for use to harvest crops disposed on a continuous tray that provides the advantages discussed above and overcomes the disadvantages and limitations associated with presently available harvesting machines used with the continuous tray method of production.

It is an important object of the present invention to provide a crop pick-up head for use to harvest crops disposed on a continuous tray that is configured to attach to a variety of harvesting machines having different crop conveying mechanisms or that can be incorporated into a harvesting machine to efficiently and effectively separate the crop from the continuous tray.

It is also an important object of the present invention to provide a crop pick-up head for use to harvest crops disposed on a continuous tray that can be operated by a single individual to pick-up a leading edge of the continuous tray from the ground, separate the crop from the tray, convey the crop to a receptacle and transfer the empty tray toward the rear of the harvesting machine.

It is also an object of the present invention to provide a crop pick-up head for use to harvest crops disposed on a continuous tray that is relatively inexpensive to manufacture, easy and cost efficient to operate and which removes the crop from the tray in a manner that does not damage or otherwise result in loss of the crop.

It is a further object of the present invention to provide a crop pick-up head for use to harvest crops disposed on a continuous tray that is configured to move between adjacent rows of vines or other plants to effectively and efficiently separate the crop from the tray.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 6 is an isolated top view of an alternative embodiment of the crop conveying mechanism comprising an auger device and the transferring mechanism comprising a rearward conveyor; and FIG. 7 is an isolated perspective view of an alternative embodiment of the crop conveying mechanism comprising a lateral conveyor and the transferring mechanism comprising a rearward conveyor.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. As will be readily understood by those skilled in the art, the enclosed figures and drawings are merely illustrative of a preferred embodiment and represent one of several different ways of configuring the present invention. Although specific components, materials, configurations and uses are illustrated, it will be readily understood that a number of variations to the components and to the configuration of those components described herein and in the accompanying figures can be made without changing the scope and function of the invention set forth herein. For instance, the figures and description provided herein are generally directed to a crop pick-up head attached to a self-propelled harvesting machine used to harvest raisins disposed on a continuous paper tray, however, those skilled in the art will readily understand that this is merely for purposes of simplifying the present disclosure and that the present invention is not so limited as it may be utilized with other types of harvesting machines, other crops and other types of continuous trays.

Figure 1:
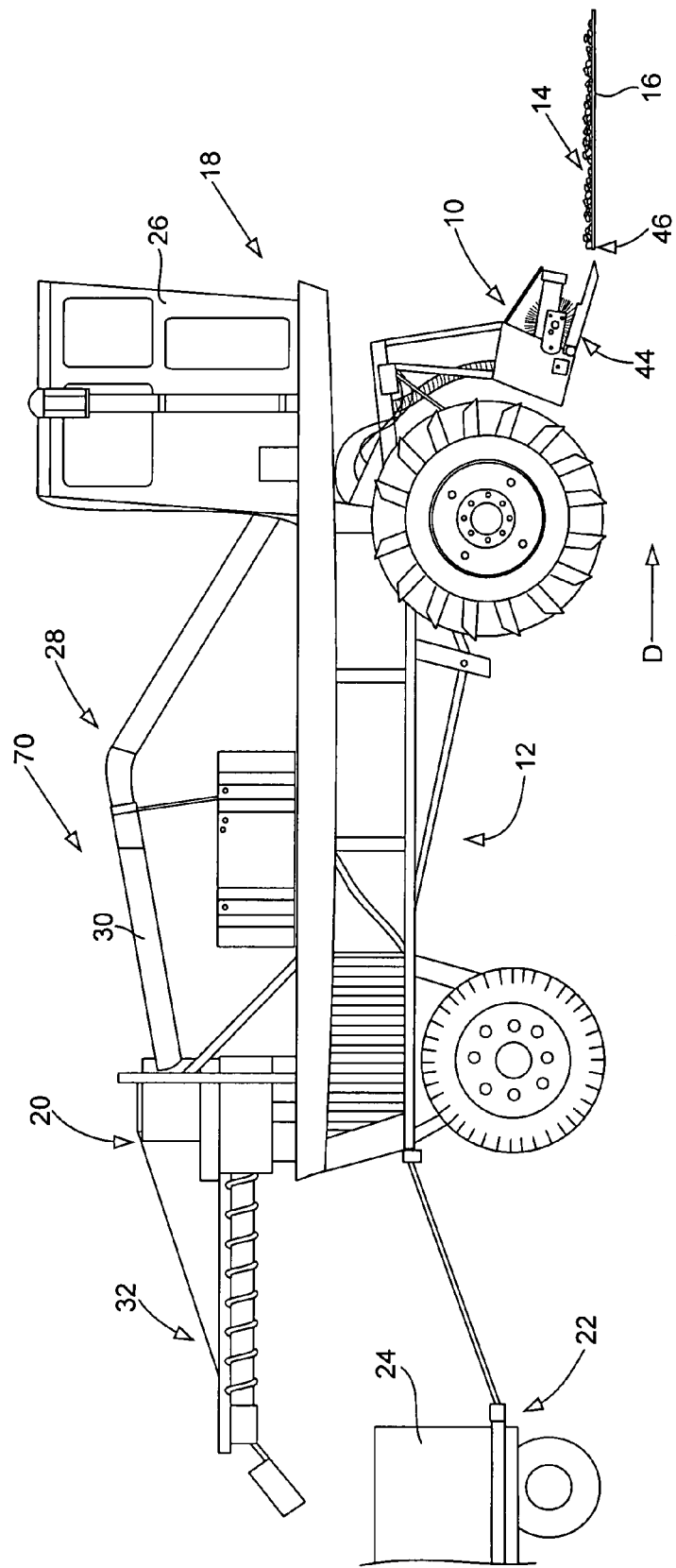
FIG. 1 is a side view of a crop pick-up head configured according to a preferred embodiment of the present invention shown attached to the front of a harvesting machine and positioned at the leading edge of a continuous tray having crop disposed thereon.

A crop pick-up head that is manufactured out of the components and configured pursuant to a preferred embodiment of the present invention is shown generally as 10 in FIGS. 1 through 4. In FIG. 1, crop pick-up head 10 is shown attached to harvesting machine 12 for harvesting a crop 14, such as raisins and the like, that is disposed on continuous paper tray 16 laid out along the length of the path between adjacent rows of plants, such as vines (not shown). Preferably, crop pick-up head 10 is attached to the front end 18 of harvesting machine 12, with the direction of travel being shown thereon as D. At rearward end 20 of harvesting machine 10 is a bin trailer 22 having one or more crop receiving bins 24 carried thereby for receiving crop 14 that is picked-up and separated from the continuous paper tray 16 by crop pick-up head 10 and then conveyed rearward by harvesting machine 12, as explained in more detail below. In the configuration shown in FIG. 1, bin trailer 22 is shown attached to harvesting machine 12. As will be readily appreciated by those skilled in the art, various configurations are available for transporting bins 24 on or behind harvesting machine 12 so that the crop 14 can be received therein. For instance, harvesting machine 12 can carry one or more bins 24 or the bins can be transported on a separately propelled vehicle that travels behind harvesting machine 12 during use. Likewise, the crop 14 in bin 24 can be stored therein until the end of the path or, as known in the art, crop 14 can be conveyed over the vines to the adjacent path where it is received in a second bin (not shown) that travels in corresponding relation to harvesting machine 12 as it moves along the row of vines.

Harvesting machine 12 can be of the type that is self-propelled, with a control booth 26 that allows a single operator to control the operation thereof, or it can be of the type that is towed behind or otherwise propelled by the operation of another vehicle, such as a tractor or the like (not shown). In the configuration shown in FIG. 1, harvesting machine 12 has an air conveyor system 28 with one or more sections of conveyor pipe 30 that are configured to pneumatically transport crop 14 to an auger conveyor system 32 which mechanically conveys crop 14 to the end thereof where crop 14 is deposited into bin 24. Harvesting machine 12, bin trailer 22, air conveyor system 28 and auger conveyor system 32 are intended to be examples of the various types of machines and mechanisms with which crop pick-up head 10 of the present invention can be utilized to harvest crop 14 from continuous paper tray 16. Likewise, while the description and claims herein refer to use of a continuous paper tray 16 on which the crop 14 is disposed, it is to be understood that the present invention is not limited to use with paper materials. In fact, crop pick-up head 10 can be utilized to separate crop 14 from any type of continuous tray or other supporting mechanism which is utilized to support crop 14 above the ground in place of individual trays, whether the continuous tray is made out of paper or other material or materials.

Figure 4:
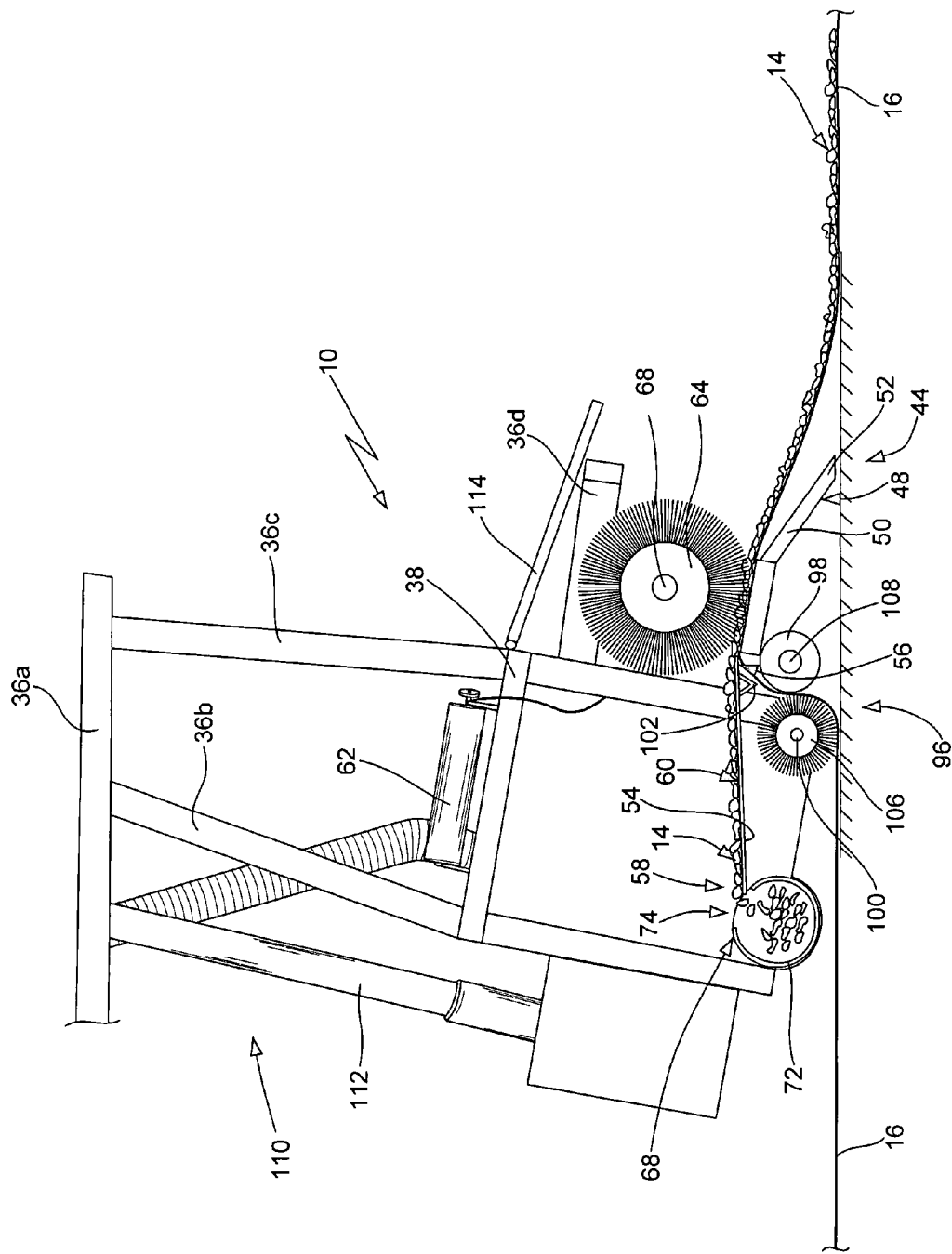
FIG. 4 is a cross-sectional side view of the crop pick-up head of FIG. 2 showing the path of the continuous tray and crop therethrough.

In the preferred embodiment, where crop pick-up head 10 is a separate component that attaches to the front end 18 of harvesting machine 12, crop pick-up head 10 comprises a support frame 34 that is made up of a plurality of frame members 36, such as 36a, 36b, 36c and 36d shown in FIG. 4, and frame panels 38 that are configured in a manner to support the components of crop pick-up head 10 in operative relation to harvesting machine 12 and continuous paper tray 16. As shown in FIG. 4, support frame 34 has a forward end 40 and a rearward end 42. As utilized herein, forward and rearward are intended to refer to the general direction of travel D, which is towards continuous paper tray 16, of harvesting machine 12 when in use to harvest crop 14. Preferably, support frame 34 is attached to harvesting machine 12 such that crop pick-up head 10 is projecting generally forward thereof, as shown in FIG. 1, to engage the continuous paper tray 16 prior to the wheels, motor and other operating components of harvesting machine 12 passing thereby. This configuration will reduce the likelihood that any dirt, rocks or other debris disturbed by harvesting machine 12 will be mixed into the crop 14 on continuous paper tray 16. In an alternative embodiment, crop pick-up head 10 is incorporated into harvesting machine 12 to provide an integral harvesting unit for retrieving and separating crop 14 from the continuous paper tray 16. As with the preferred embodiment, crop pick-up head 10 is preferably positioned at the front end 18 of harvesting machine 12 to project generally forward thereof.

Figure 2:
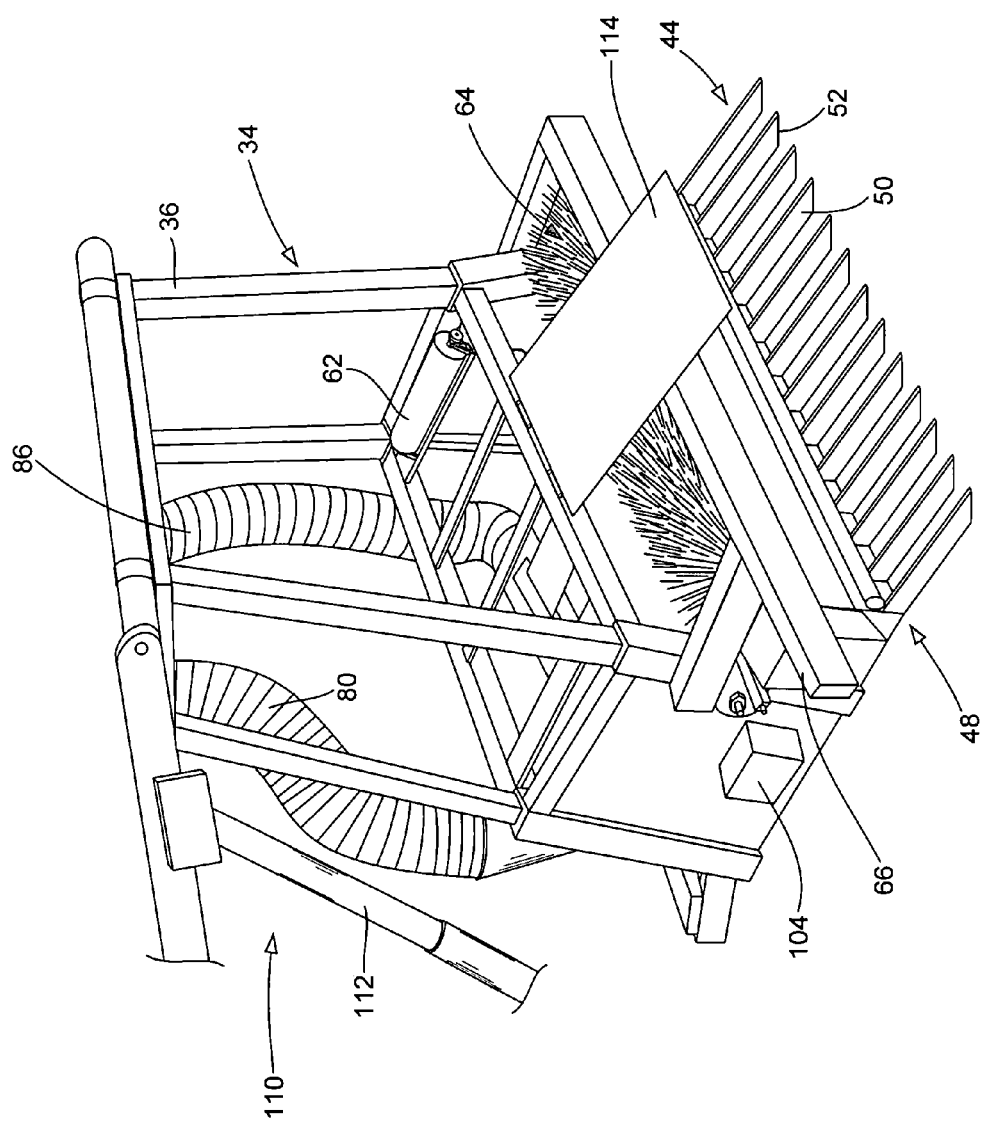
FIG. 2 is a front perspective view of the crop pick-up head of FIG. 1 with a portion of the cover plate removed to show the brush used to pull in the continuous tray and separate the crop therefrom.
Figure 3:
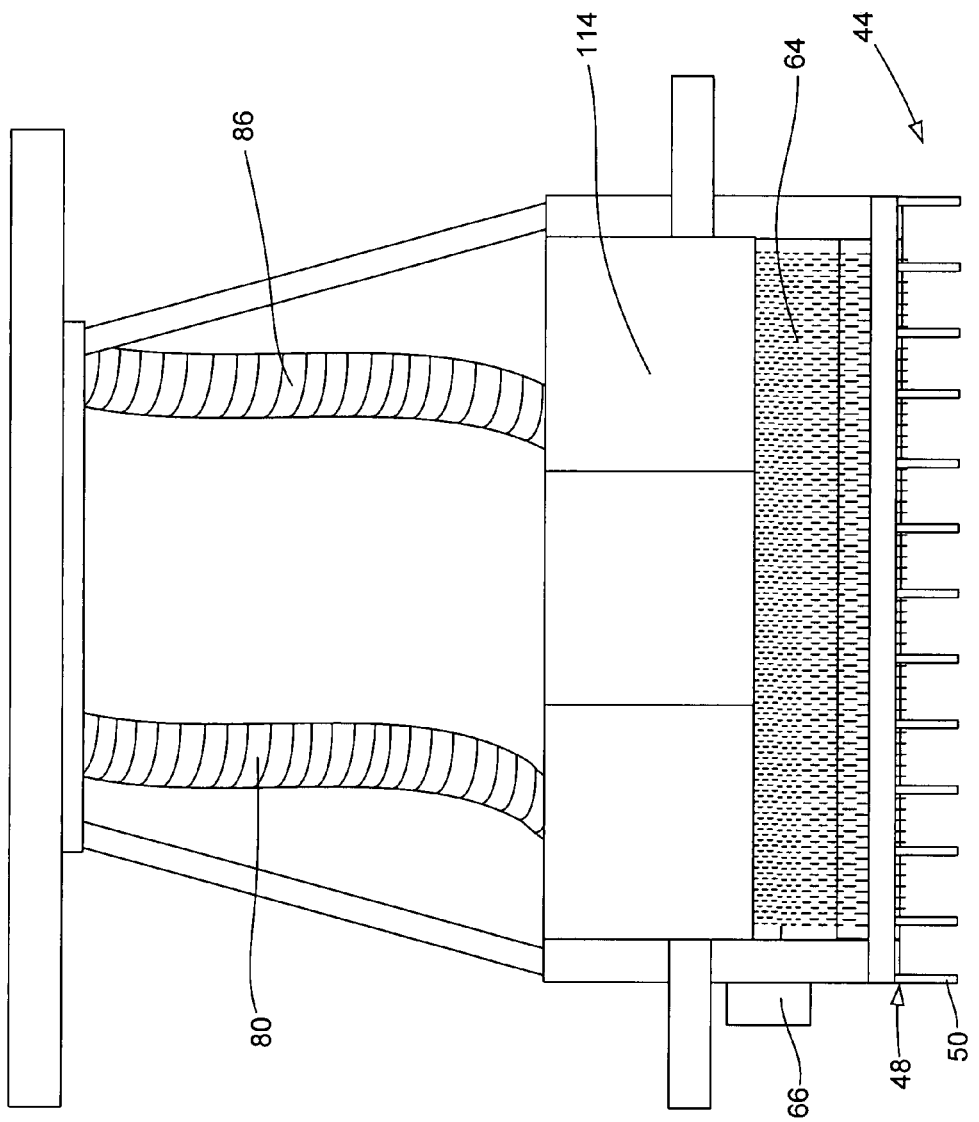
FIG. 3 is a front view of the crop pick-up head of FIG. 2.

Attached to the forward end 40 of support frame 34 is a paper lifting mechanism 44 configured to engage and lift a leading edge 46 of continuous paper tray 16 as it lays on the ground between rows of vines or other plants. As described in more detail below, lifting mechanism 44 initially lifts leading edge 46 and guides it into crop pick-up head 10 and then lifts and supports the remainder of continuous paper tray 16 as crop pick-up head separates the crop 14 from continuous paper tray 16. In the preferred embodiment lifting mechanism 44 is a fork 48 having a plurality of forward extending tines 50, as best shown in FIGS. 2 and 3. Preferably, the forward end 52 of tines 50 are shaped and configured to slide across the ground and under the leading edge 46 of continuous paper tray 16 to facilitate its entry into crop pick-up head 10 so that the raisins or other crop 14 may be separated therefrom and transported to bin 24. The tines 50 only need to extend forward a sufficient distance to lead and then support continuous paper tray 16 as it is fed into crop pick-up head 10. In one embodiment, tines 50 are approximately ten inches long, although a variety of different lengths would be sufficient for tines 50. In the preferred embodiment, tines 50 are in spaced apart relation with each other to prevent fork 48 from gathering dirt, rocks and other debris. Alternatively, fork 48 could be configured solid across the width of crop pick-up head 10 or configured with a screen or screen-like configuration. In another alternative embodiment, lifting mechanism 44 can utilize an air cylinder (not shown) that is configured to blow air forward of crop pick-up head 10 under leading edge 46 of continuous paper tray 16 so as to provide the initial lift needed to feed continuous paper tray 16 into crop pick-up head 10. Various other devices may also be suitable for use with lifting mechanism 44.

Crop pick-up head 10 also includes a generally planar guide plate 54, which is best shown in FIG. 4, that is configured to aid in the separation of the crop 14 from the continuous paper tray 16 and the transfer of the crop 14 to, ultimately, bin 24. In the preferred embodiment, guide plate 54 has a first end 56, a second end 58 and an upper surface 60 that extends substantially across the width of crop pick-up head 10. Guide plate 54 is attached to support frame 34 in a manner that positions its first end 56 substantially adjacent to, but in spaced apart relation above, lifting means 44. In the preferred embodiment, first end 56 of guide plate 54 is slightly above the top of fork 48, as best shown in FIG. 4, such that there is a small gap between guide plate 54 and fork 50 for continuous paper tray 16 to pass between. With the other components of crop pick-up head 10 described below, the continuous paper tray 16 is pushed and pulled through the gap between the first end 56 of guide plate 54 and the top of fork 48 in a manner that facilitates crop 14 being transferred from continuous paper tray 16 to the upper surface 60 of guide plate 54. Depending on the material for continuous paper tray 16, in order to reduce the likelihood of tearing continuous paper tray 16 it is generally preferred that the first end 56 of guide plate 54 not rub against, scrape or otherwise contact continuous paper tray 16. If desired, the first end 56 of guide plate 54 can be angled to a point to further facilitate the movement of crop 14 onto upper surface 60. In one embodiment, guide plate 54 can be fixedly attached to support frame 34, or directly to harvesting machine 12, in the desired position. In the preferred embodiment, however, crop pick-up head 10 includes a control mechanism 62, shown in FIG. 2, that is configured to raise the first end 56 of guide plate 54 to ease the entry of the leading edge 46 of continuous paper tray 16 into crop pick-up head and then lower guide plate 54 to the substantially adjacent position shown in FIG. 4. Control mechanism 62 can be manually operated, such as with the use of a lever or like device, or attached to and driven by an air cylinder (as shown) or other power source that is configured to pivot guide plate 54 so as to selectively raise or lower the first end 56 thereof. Guide plate 54 can be made out of metal, including aluminum or food-grade stainless steel, or a wide variety of other materials, such as various plastics, composites or combinations of such materials.

To transfer the raisins or other crop 14 from continuous paper tray 16 to the upper surface 60 of guide plate 54, crop pick-up head 10 utilizes a forward brush 64 that is rotatably attached to support frame 34. In the preferred embodiment, forward brush 64 has a plurality of outwardly extending bristles that are configured to engage crop 14, without damage thereto, in a manner that directs the crop 14 from continuous paper tray 16 to the upper surface 60 of guide plate 54, as shown in FIG. 4. As additional crop 14 is transferred from the continuous paper tray 16 to guide plate 54, forward brush 64 will push the crop 14 from the first end 56 to the second end 58 of guide plate 54. Preferably, as best shown in FIGS. 2 and 4, a first motor 66 is attached to the axle 68 of forward brush 64 to rotate it and push crop 14 onto guide plate 54. First motor 66 can be a hydraulic motor, electric motor or other types of motors. Alternatively, forward brush 64 can be provided with a mechanism that rotates it in response to the forward motion of harvesting machine 12. If desired, one or more pulley and belt systems can be operatively connected to forward brush 64 or first motor 66 to assist in the rotation of forward brush 64. In one embodiment, a twelve inch diameter forward brush 64 having stiff, non-metallic wire-like bristles is utilized with crop pick-up head 10.

Figure 5:
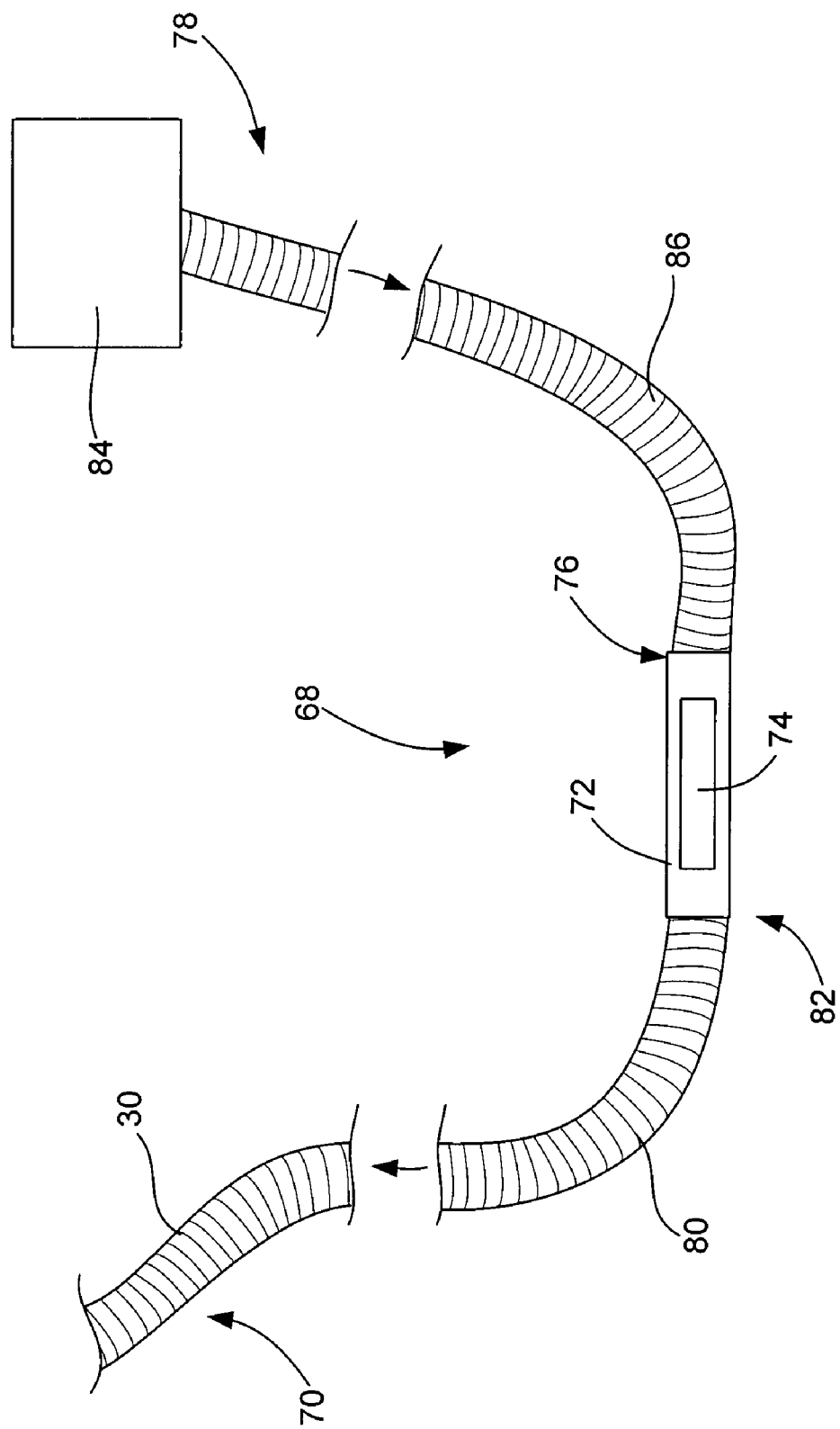
FIG. 5 is an isolated front view of the crop conveying tube utilized with the crop pick-up head of FIG. 2 shown with the inlet tube connected to a supply of pressurized air and an outlet tube connected to a conveying pipe of the rearward conveying transferring mechanism.

To convey the crop 14 from guide plate 54 to bin 24, crop pick-up head 12 of the present invention also includes a crop conveying mechanism 68, best shown in FIGS. 4 and 5, that receives and conveys the crop 14 and a transferring mechanism 70, best shown in FIG. 1, for transferring the crop 14 from the crop conveying mechanism 68 to bin 24. Crop conveying mechanism 68 is attached to support frame 34 and disposed generally at the second end 58 of guide plate 54 to receive crop 14 that is pushed off the edge of second end 58 by the rotating movement of forward brush 64, which continually pushes crop 14 across the upper surface 60 of guide plate 54. In the embodiment of FIG. 1, transferring mechanism 70 includes the air conveyor system 28, made up of one or more sections of conveyor pipe 30, and the auger conveyor 32 which drops the crop 14 into bin 24. In a preferred embodiment of the present invention, crop conveying mechanism 68 comprises a crop conveying tube 72 having a slot-like crop intake opening 74, best shown in FIGS. 4 and 5, that is disposed generally below the second end 58 of guide plate 54 to receive crop 14 into the crop conveying tube 72 that is pushed off the second end 58 of guide plate 54. As shown in FIG. 5, the first end 76 of crop conveying tube 72 is connected to an air supply mechanism 78 that is configured to deliver pressurized air to crop conveying tube 72 so as to transfer the crop 14 to an uptake tube 80 which interconnects the second end 82 of crop conveying tube 72 with transferring mechanism 70, which is attached to harvesting machine 12. In the preferred embodiment, air supply mechanism 78 comprises a source of pressurized air 84, such as a fan or the like, and intake tube 86. As will be readily understood by those skilled in the art, air supply mechanism 78 should be sized and configured to deliver a sufficient quantity of pressurized air through intake tube 86, crop conveying tube 72, uptake tube 80 and the section(s) of conveyor pipe 30 to carry crop 14 to auger conveyor 32 for transfer to bin 24.

As an alternative to the pneumatic system described above, crop pick-up head 10 can utilize various other crop transfer systems, which are generally well known in the art, for crop conveying mechanism 68. For instance, crop conveying mechanism 68 can utilize one or more of the mechanical transfer systems shown in FIGS. 6 and 7. The embodiment shown in FIG. 6 utilizes an auger device 88 to transfer crop 14 from the second end 58 of guide plate 54 to the transferring mechanism 70, which in this embodiment comprises a rearward conveyor 90 that transfers crop 14 to bin 24, either with or without auger conveyor 32 at the rearward end 20 of harvesting machine 12. In this embodiment, the auger device 88 is at least partially disposed in crop conveying tube 72 and configured to convey the raisins or other crop 14 that is received therein through crop intake opening 74 from the second end 58 of guide plate 54, as described above, to rearward conveyor 90. Auger motor 92 is operatively connected to auger device 88 to cause it to rotate and move crop 14 from first end 76 to second end 82 of crop conveying tube 72. In one configuration of this embodiment, rearward conveyor 90 is an endless conveyor system that delivers the crop 14 to auger conveyor 32 for transport to bin 24. In another configuration, rearward conveyor 90 delivers the crop 14 directly to bin 24. The embodiment shown in FIG. 7 utilizes a lateral conveyor 94 that is disposed below the second end 58 of guide plate 54 and configured to receive crop 14 thereon, by the action of forward brush 64 moving crop 14 across the upper surface 60 of guide plate 54 as described above. After receiving crop 14, lateral conveyor 94 conveys the crop 14 to rearward conveyor 90, which then conveys the crop 14, directly or via auger conveyor 32, to bin 24. For either embodiment, an auger device or other conveying system can be utilized with crop pick-up head 10 of the present invention instead of the rearward conveyor 90 shown in FIGS. 6 and 7. Various other types of conveying systems or combinations of conveying systems can also be utilized with crop pick-up head 10 to transport the crop 14 from the second end 58 of guide plate 54 to bin 24.

As discussed above, continuous paper tray 16 passes through the slight gap between the first end 56 of guide plate 54 and the upper surface of the lifting mechanism 44 (i.e., fork 48) as the crop 14 is brushed off the continuous paper tray 16 by forward brush 64. Initially, the rotating brushing motion of forward brush 64 will also push the continuous paper tray 16 rearward into crop pick-up head 10. To further facilitate the drawing in of the continuous paper tray 16 and its discharge out of crop pick-up head 10, the present invention also includes a pulling mechanism 96. In the preferred embodiment of crop pick-up head 10, pulling mechanism 96 is attached to the support frame 34 and disposed generally below and rearward of the first end 56 of guide plate 54, as best shown in FIG. 4, so as to draw the continuous paper tray 16 downward and behind crop pick-up head 10 so as to not interfere with its operation or the operation of harvesting machine 12. In a preferred configuration, pulling mechanism 96 comprises roller 98 rotatably attached to support frame 34, a rearward brush 100 configured to cooperate with roller 98 and a directing mechanism 102 configured to direct the continuous paper tray 16 between roller 98 and rearward brush 100. Preferably a second motor 104 is in operative engagement with the axle 106 of at least rearward brush 100 to rotate it during operation of crop pick-up head 10. In alternative embodiments, second motor 104 is also in operative engagement with the axle 108 of roller 98 or another motor (not shown) is in engagement with roller 98 to rotate it during use. Directing mechanism 102 is shaped and configured such that when the leading edge 46 of continuous paper tray 16 hits against or passes by directing mechanism 102 the continuous paper tray 16 will be directed between roller 98 and rearward brush 100, which are preferably configured to draw the continuous paper tray 16 into crop pick-up head 10 of the present invention. In one embodiment, the diameters of roller 98 and rearward brush 98 are approximately six inches and directing mechanism 102 is an angle iron attached to support frame 34 or to a frame component of harvesting machine 12. As known to those skilled in the art, pulling mechanism 96 can comprise a pair of rollers, a pair of brushes and/or other devices for pulling continuous paper tray 16 rearward through crop pick-up head 10. Likewise, the directing mechanism 102 of the pulling mechanism can be a variety of different types of devices that are configured to direct and guide continuous paper tray 16, particularly its forward end 46, between the operating components of pulling mechanism 96.

The preferred embodiment of crop pick-up head 10 of the present invention includes a positioning mechanism 110, an example of which is shown as the hydraulic cylinder 112 in FIGS. 2 and 4, for movement of all or a portion of crop pick-up head 10 in a vertical (i.e., up and down) direction and/or a horizontal (i.e., left and right) direction. In one embodiment, the hydraulic cylinder 112 of positioning mechanism 110 interconnects a frame component on the harvesting machine 12 and support frame 34 and is configured to raise or lower at least the forward end 40 of support frame 34 so as to raise or lower the tines 50 of fork 48. Alternatively, hydraulic cylinder 112 can interconnect separate sections of support frame 34 such that the froward end 40 can be raised and lowered separately from rearward end 42 or interconnect support frame 34 and lifting mechanism 44 so as to raise and lower fork 48. In any such configuration, the operator can raise fork 48 when he or she is moving harvesting machine 12 between fields or between rows in a field and then lower fork 48 to the ground level to allow it to move below the continuous paper tray 16 when it is desired to use crop pick-up head 10 to collect the crop 14 from the field and separate the crop 14 from the continuous paper tray 16. In another embodiment, positioning mechanism 110 is configured to move all or a portion of crop pick-up head 10 in the lateral direction to allow the operator to adjust the left/right positioning of fork 48 relative to continuous paper tray 16, such as at the beginning of a row when alignment with the leading edge 46 is necessary. As with the vertical positioning, the lateral positioning can move support frame 34 relative to harvesting machine 12, the forward end 40 of support frame 34 relative to the rearward end 42 or the lifting mechanism 44 relative to support frame 34 so as to substantially align the crop pick-up head 10 with the continuous paper tray 16 without having to realign the entire harvesting machine 12. In the preferred embodiment, positioning mechanism 110 is configured to, at a minimum, both raise and lower lifting mechanism 44 for movement or use of harvesting machine 12 and laterally align lifting mechanism 44 (i.e., fork 48) with the continuous paper tray 16.

The preferred embodiment of the crop pick-up head 10 of the present invention also includes one or more cover plates 114, shown in FIGS. 2 through 4, that are used to cover forward brush 64 to prevent any crop 14 from being flung out of crop pick-up head 10. FIG. 2 shows one cover plate 114 in place, the others being removed to better show forward brush 64. If desired, one cover plate 114 can be utilized to extend across the entire width of forward brush 64 or multiple cover plates 114 can function together to cover the entire width. As will be readily apparent to those skilled in the art, various configurations for cover plate 114 can be utilized with crop pick-up head 10.

In the embodiment of crop pick-up head 10 shown in the figures, the continuous paper tray 16 is laid down on the ground behind harvesting machine 12 after the crop 14 is separated therefrom and it is pulled through pulling mechanism 96. Typically, the continuous paper tray 16 is then gathered and burned in the field. In an alternative embodiment, crop pick-up head 10 or harvesting machine 12 can include a grinder unit (not shown) that receives the separated continuous paper tray 16 and grinds it into very small pieces for distribution in the row where it can dissolve or otherwise be incorporated into the soil, thereby eliminating the pollution and other problems associated with burning the material in the field.

In operation to gather crop 14 that is disposed on continuous paper trays 16 in the field, the operator will move the harvesting machine 12, having crop pick-up head 10 attached thereto or incorporated therewith, into position in front of leading edge 46 of continuous paper tray 16. Typically, the continuous paper tray 16 will be laid out the entire length of the path between adjacent rows of vines or other plants. Utilizing the positioning mechanism 110, the operator lowers fork 48 so the tines 50 are substantially adjacent the ground so they can slide under the leading edge 46 of continuous paper tray 16. Although the operator will initially align lifting mechanism 44 with continuous paper tray 16 by the proper positioning of harvesting machine 12, he or she will typically fine tune the alignment of fork 48 with continuous paper tray 16 by utilizing positioning mechanism 110 to pivot or otherwise shift fork 48 laterally until the continuous paper tray is generally centered with lifting mechanism 44. For the typical operator, the lowering and right/left adjustment of fork 48 will take very little time.

Once aligned, the operator engages the motor(s) that operate forward brush 64 and rearward brush 100 (and if applicable, roller 98), such as first motor 66 and second motor 104, respectively. With the first end 56 of guide plate 54 raised, the operator moves harvesting machine 12 forward, causing lifting mechanism 44 to lift the leading edge 46 of the continuous paper tray 16 and forward brush 64 to pull leading edge 46 into crop pick-up head 10 into the gap between lifting mechanism 44 and first end 56 of guide plate 54. The operator then lowers first end 56 of guide plate 54 to narrow the gap between lifting mechanism 44 and guide plate 54. The rotating motion of forward brush 64 will brush the crop 14, such as raisins, off of the continuous paper tray 16 onto guide plate 54 and push the continuous paper tray 16 rearward. The continuous paper tray 16 is engaged by pulling mechanism 96 and to continue to pull continuous paper tray 16 into crop pick-up head 10 and dispose it rearward of harvesting machine 12. In the preferred embodiment, the continuous paper tray 16 is directed downward between roller 98 and rearward brush 100 by directing mechanism 102 and pulled by the cooperating rolling of roller 98 and rearward brush 100.

As forward brush 64 continues to brush crop 14 onto guide plate 54, thereby separating it from continuous paper tray 16, the crop 14 will be pushed from the first end 56 of guide plate 54 to its second end 58 where it is received by crop conveying mechanism 68. In the preferred embodiment, the crop 14 is pushed off of second end 58 of guide plate 54 into crop conveying tube 72 through crop intake opening 74. The air supply mechanism 78 directs pressurized air from the supply of pressurized air 84 through intake tube 86, crop conveying tube 72 and uptake tube 80 to convey the crop 14 to transferring mechanism 70, which then transfers crop 14 to bin 24 using the same pressurized air. In an alternative embodiment, crop conveying mechanism 68 can comprise an auger device 88 that moves the crop 14 to a rearward conveyor 90 that transfers the crop 14 either directly to the bin 24 or to the transferring mechanism 70 for transfer to bin 24. In another alternative embodiment, crop conveying mechanism 68 is a lateral conveyor 94 that conveys crop 14 to the rearward conveyor 90 or other conveying system, such as an auger mechanism, for transfer to bin 24.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A crop pick-up head for use with a harvesting machine to pick up a crop disposed on a continuous tray, said crop pick-up head comprising:

a support frame attached to said harvesting machine, said support frame having a forward end and a rearward end;

means at said forward end of said support frame for lifting said continuous tray;

a guide plate having a upper surface, a first end and a second end, said guide plate attached to said support frame so as to position said first end substantially adjacent to but in spaced apart relation above said lifting means to allow said continuous tray to pass therebetween;

crop conveying means attached to said support frame and disposed generally at said second end of said guide plate for conveying said crop to a receptacle, said crop conveying means configured to receive said crop from said guide plate;

means attached to said support frame for pulling said continuous tray between said first end of said guide plate and said lifting means and toward said second end of said support frame; and a forward brush rotatably attached to said support frame, said forward brush configured to transfer said crop from said continuous tray onto said upper surface of said guide plate and to push said crop from said first end of said guide plate to said second end thereof so as to direct said crop to said crop conveying means.

2. The crop pick-up head according to claim 1, wherein said support frame is attached to a forward end of said harvesting machine.

3. The crop pick-up head according to claim 1, wherein said lifting means comprises a fork having a plurality of forward extending tines.

4. The crop pick-up head according to claim 1, wherein said crop conveying means comprises a crop conveying tube disposed at said second end of said guide plate, said crop conveying tube having a crop intake opening configured to receive said crop from said second end of said guide plate into said crop conveying tube, said forward brush configured to direct said crop through said crop intake opening into said crop conveying tube.

5. The crop pick-up head according to claim 4, wherein said crop conveying means comprises a supply of pressurized air pneumatically connected to a first end of said crop conveying tube to convey said crop through said crop conveying tube to a second end thereof, said second end of said crop conveying tube connected to a means for transferring said crop to said receptacle.

6. The crop pick-up head according to claim 5, wherein said supply of pressurized air is configured to convey said crop to said receptacle through at least a portion of said transferring means.

7. The crop pick-up head according to claim 4, wherein said crop conveying means comprises an auger device at least partially disposed in said crop conveying tube for conveying said crop to a means attached to said harvesting machine for transferring said crop from said crop conveying tube to said receptacle.

8. The crop pick-up head according to claim 1, wherein said crop conveying means comprises a conveyor belt disposed below said second end of said guide plate and configured to receive said crop thereon for conveying said crop to a means attached to said harvesting machine for transferring said crop to said receptacle.

9. The crop pick-up head according to claim 1 further comprising a means for selectively controlling the position of said first end of said guide plate relative to said continuous tray, said controlling means configured to dispose said first end of said guide plate substantially adjacent to said continuous tray.

10. The crop pick-up head according to claim 1 further comprising means attached to said support frame for positioning said pick-up head relative to said continuous tray.

11. The crop pick-up head according to claim 1, wherein said pulling means comprises a roller rotatably attached to said support frame, a rearward brush rotatably attached to said support frame to pull said continuous tray towards said rearward end of said frame and a directing means positioned below said guide plate to direct said continuous tray between said roller and said rearward brush.

12. The crop pick-up head according to claim 11 further comprising a motor connected to each of said forward brush and said rearward brush to power the rotation thereof.

13. The crop pick-up head according to claim 1 further comprising a first motor operatively connected to said forward brush for rotating said forward brush.

14. The crop pick-up head according to claim 1, wherein said crop conveying means comprises a crop conveying tube disposed at said second end of said guide plate and a supply of pressurized air pneumatically connected to a first end of said crop conveying tube, said crop conveying tube having a crop intake opening configured to receive said crop from said second end of said guide plate into said crop conveying tube, said forward brush configured to direct said crop through said crop intake opening into said crop conveying tube, said supply of pressurized air configured to convey said crop through said crop conveying tube to a second end thereof, said second end of said crop conveying tube connected to a means for transferring said crop to said receptacle.

15. A crop pick-up head for use with a harvesting machine to pick up a crop disposed on a continuous tray, said crop pick-up head comprising:

a support frame attached to a front end of said harvesting machine, said support frame having a forward end and a rearward end;

a fork at said forward end of said support frame, said fork having a plurality of tines configured to lift said continuous tray;

a generally planar guide plate having a upper surface, a first end and a second end, said guide plate attached to said support frame so as to position said first end substantially adjacent to but in spaced apart relation above said fork to allow said continuous tray to pass therebetween;

crop conveying means attached to said support frame and disposed generally at said second end of said guide plate for conveying said crop to a receptacle, said crop conveying means having a crop conveying tube disposed at said second end of said guide plate, said crop conveying tube having a crop intake opening configured to receive said crop from said second end of said guide plate into said crop conveying tube;

means attached to said support frame and disposed generally below said guide plate and rearward of said first end of said guide plate for pulling said continuous tray between said first end of said guide plate and said lifting means and toward the second end of said support frame; and a forward brush rotatably attached to said frame, said forward brush configured to transfer said crop from said continuous tray onto said upper surface of said guide plate and to push said crop from said first end of said guide plate to said second end thereof so as to direct said crop to said crop conveying means, said forward brush configured to direct said crop through said crop intake opening into said crop conveying tube.

16. The crop pick-up head according to claim 15, wherein said crop conveying means comprises an auger device at least partially disposed in said crop conveying tube for conveying said crop to a means attached to said harvesting machine for transferring said crop from said crop conveying tube to said receptacle.

17. The crop pick-up head according to claim 15, wherein said pulling means comprises a roller rotatably attached to said support frame, a rearward brush rotatably attached to said support frame to pull said continuous tray towards said rearward end of said frame and a directing means positioned below said guide plate to direct said continuous tray between said roller and said rearward brush.

18. The crop pick-up head according to claim 15, wherein said crop conveying means comprises a supply of pressurized air pneumatically connected to a first end of said crop conveying tube to convey said crop through said crop conveying tube to a second end thereof, said second end of said crop conveying tube connected to a means for transferring said crop to said receptacle.

19. A harvesting machine to pick up a crop disposed on a continuous tray, said harvesting machine comprising:
- a support frame attached to a front end of said harvesting machine, said support frame having a forward end and a rearward end;
- means at said forward end of said support frame for lifting said continuous tray;
- a guide plate having a upper surface, a first end and a second end, said guide plate attached to said support frame so as to position said first end substantially adjacent to but in spaced apart relation above said lifting means to allow said continuous tray to pass therebetween;
- crop conveying means attached to said support frame and disposed generally at said second end of said guide plate for conveying said crop to a receptacle, said crop conveying means configured to receive said crop from said guide plate;
- means attached to said support frame for pulling said continuous tray between said first end of said guide plate and said lifting means and toward said second end of said support frame; and
- a forward brush rotatably attached to said support frame, said forward brush configured to transfer said crop from said continuous tray onto said upper surface of said guide plate and to push said crop from said first end of said guide plate to said second end thereof so as to direct said crop to said crop conveying means.

20. The crop pick-up head according to claim 19, wherein said pulling means comprises a roller rotatably attached to said support frame, a rearward brush rotatably attached to said support frame to pull said continuous tray towards said rearward end of said frame and a directing means positioned below said guide plate to direct said continuous tray between said roller and said rearward brush.

* * * * *